Dec. 21, 1943.   G. E. BULLOCK   2,337,149
CARTRIDGE CHAMBER AND CARTRIDGE FOR SPRAYING DEVICES
Filed Aug. 2, 1940
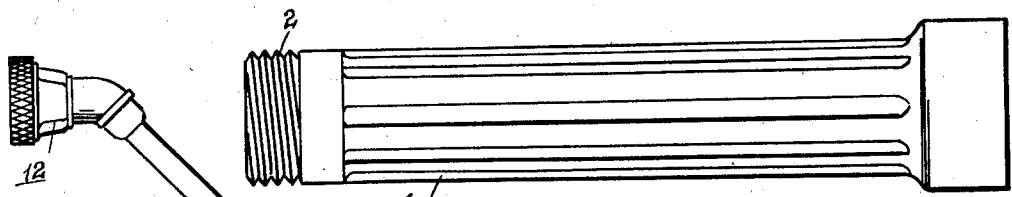
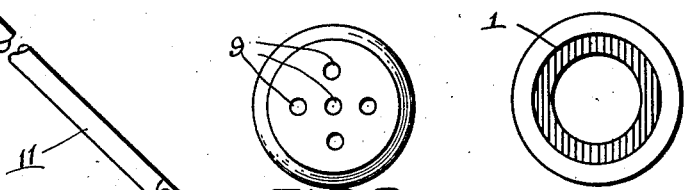
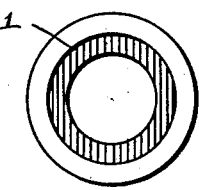
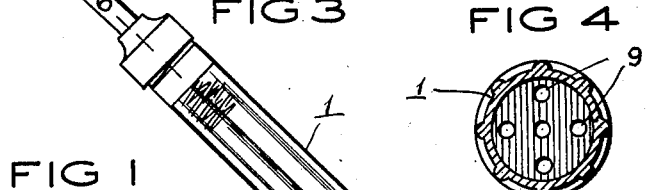
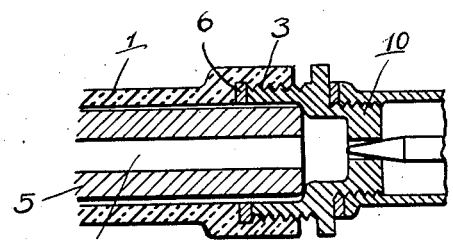
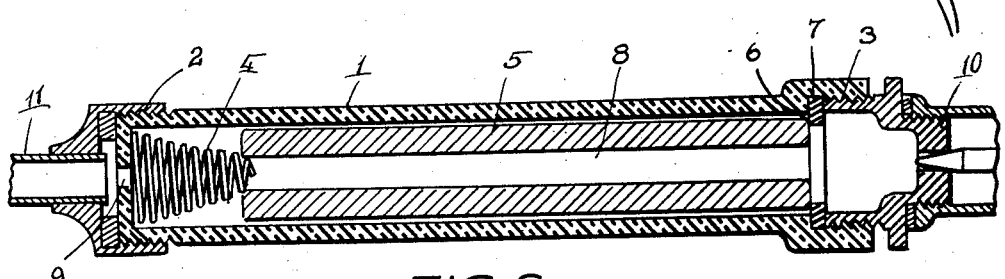
INVENTOR
GILES E. BULLOCK
BY
ATTORNEY Patented Dec. 21, 1943

2,337,149

UNITED STATES PATENT OFFICE 2,337,149

CARTRIDGE CHAMBER AND CARTRIDGE FOR SPRAYING DEVICES

Giles E. Bullock, Rochester, N. Y.

Application August 2, 1940, Serial No. 349,627

3 Claims. (Cl. 299—83)

This invention relates to sprayers and more especially to a spraying device for spraying insecticide, fertilizer or other substances in liquid suspension, and the principal object of the invention is to provide a novel construction for such a spraying device into which the substance for spraying is inserted in the form of a soluble cartridge and is efficiently and uniformly dissolved therein by the action of the water passing thru the spraying device.

Another object of this invention is to provide a novel form of cartridge for use in the spraying device.

These and other objects and attendant advantages will become more readily apparent from the detailed description of one embodiment of my invention which follows, reference being had to the accompanying drawing in which Figure 1 is a side elevation of a spraying device embodying my invention.

Figure 2 is an enlarged detail side elevation of the cartridge chamber of the spraying device.

Figure 3 is a front elevation of the cartridge chamber looking at the left hand end of Fig. 2.

Figure 4 is a rear elevation of the cartridge chamber looking at the right hand end of Fig. 2.

Figure 5 is a cross section of the cartridge chamber.

Figure 6 is a longitudinal sectional view of the cartridge chamber and parts of the spraying device with which it is used, the section being taken on the line 6—6 in Figure 1.

Figure 7 is a detail sectional view illustrating a modified manner of locating the rear end of the cartridge within the cartridge chamber and its supporting member.

In the spraying device forming the subject matter of my present invention, the substance used for spraying is loaded in the form of a cartridge into a cartridge chamber in which the action of the water efficiently and uniformly dissolves the cartridge to provide a constant, adequate spray solution.

This cartridge chamber comprises a cylinder 1 which is partially closed at the front end and is threaded on the outside at 2 to have a suitable nozzle threaded thereto. The rear end is enlarged to provide for an internal thread 3 with which the cartridge chamber is threaded to a control valve or the end of a hose.

In the forward end of the cartridge chamber is provided the impeller spring 4 which is compressed when the cartridge 5 is inserted into the cartridge chamber and operates to force the cartridge toward the inlet thereof. A shoulder 6 is provided by the removable washer 7 in the enlarged end of the cartridge chamber and holds the cartridge in place in the chamber adjacent to and in line with the inlet thereof.

The cartridge 5 has a hollow center or duct 8 and the small free end of the impeller spring 4 is adapted to engage into the outlet of this duct to hold the forward end of the cartridge centered in the chamber. The rear end is seated on the shoulder 6 by the action of the spring so that the full force of water entering the chamber will pass thru the hollow center of the cartridge and leave the cartridge chamber thru the outlet openings 9,9 in the forward end thereof. In this way the inside surface of the cartridge is acted upon by the water to efficiently and uniformly dissolve the cartridge from the inside and at the ends as soon as the water passes thru the cartridge. As the cartridge dissolves and gets smaller, the impeller spring keeps it seated on the shoulder 6 so that the water continues to unobstructedly pass thru the hollow center while some of the water finds its way to the outside of the cartridge to thus dissolve the cartridge from both the inside and outside in order to produce a uniformly saturated spray from the gradually dissolving cartridge. It will be apparent that while the spring holds the cartridge firmly in place on its seat in the cartridge chamber at the beginning, the reduction in the size of the cartridge as it dissolves allows the spring to expand with the result that its pressure is gradually reduced. This gives the pressure of the water a chance to counteract the pressure of the spring and raise the cartridge off its seat to allow some water to pass around the outside of the cartridge and thus dissolve the cartridge from both the inside and outside as well as the ends as above pointed out.

As illustrated in Figure 1, a valve 10 is threaded to the intake end of the cartridge chamber so that the water entering it may be controlled for the spraying operation. The outlet end of the cartridge chamber has threaded thereto an extension 11 and at the end of the extension is mounted the nozzle 12 which causes the solution to be expelled in a spray. However, while I have shown the cartridge chamber mounted in this manner for spraying purposes, it may also be mounted directly to the end of a garden hose so as to dissolve the cartridge in the water used in sprinkling with the hose.

As illustrated in Figure 7 the cartridge 5 may be held seated within the end of the valve body or the hose connection to which the cartridge chamber is attached without in any way changing its function in efficiently and uniformly dissolving the cartridge in the manner above described. The cartridge chamber is preferably made of a transparent material.

I claim:

1. The combination with a sprinkling and spraying device, of a cylindrical cartridge chamber having a large central inlet at one end and a reduced central outlet at the other end so as to provide for the insertion of a cylindrical cartridge having a central duct extending longitudinally therethru into the large inlet, a washer removably mounted in said inlet to provide a seat for the support of one end of said cartridge at the large inlet of the chamber with the duct of the cartridge providing a continuation of said inlet, and an impeller spring between said reduced outlet and said cartridge to continually support the end of said cartridge on said washer during the dissolution of the cartridge.

2. The combination with a sprinkling and spraying device of a cartridge chamber as set forth in claim 1 in which said impeller spring has a reduced end for engagement into the end of the duct of said cartridge and central support of the cartridge to hold its duct in line with the reduced outlet from the cartridge chamber.

3. The combination with a sprinkling and spraying device of a cartridge chamber having an inlet at one end and an outlet at the other end for receipt of a soluble cartridge having a central duct longitudinally extending therethru, a removable supporting member supporting the inlet end of said chamber, a duct leading through said supporting member, a seat within said supporting member for support of one end of said cartridge adjacent the inlet thereof, and an impeller spring for yielding and continued support of the other end of said cartridge with its central duct in line with the duct of said supporting member during the dissolution of the cartridge in said chamber.

GILES E. BULLOCK.